(12) United States Patent
Turcan

(10) Patent No.: US 11,152,845 B2
(45) Date of Patent: Oct. 19, 2021

(54) FEED-FORWARD FUNCTION FOR VOLTAGE MODE CONTROL

(71) Applicant: Microchip Technology Incorporated, Chandler, AZ (US)

(72) Inventor: Gheorghe Turcan, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 15/970,938

(22) Filed: May 4, 2018

(65) Prior Publication Data

US 2019/0260279 A1   Aug. 22, 2019

Related U.S. Application Data

(60) Provisional application No. 62/710,463, filed on Feb. 16, 2018.

(51) Int. Cl.
| | |
|---|---|
| *H02M 1/00* | (2006.01) |
| *H02M 3/157* | (2006.01) |
| *H02M 1/32* | (2007.01) |
| *H02M 1/36* | (2007.01) |

(52) U.S. Cl.
CPC .............. *H02M 1/00* (2013.01); *H02M 1/32* (2013.01); *H02M 1/36* (2013.01); *H02M 3/157* (2013.01); *H02M 1/0022* (2021.05)

(58) Field of Classification Search
CPC .... H02M 3/156; H02M 3/157; H02M 3/1588; H02M 2001/0012; H02M 1/00; Y02B 70/1466
USPC .......................................................... 323/283
See application file for complete search history.

(56) References Cited

U.S. PATENT DOCUMENTS

| | | | |
|---|---|---|---|
| 4,016,451 A | 4/1977 | Engel ............................ 315/158 |
| 5,406,468 A | * 4/1995 | Booth ..................... H02M 3/28 |
| | | | 363/15 |
| 6,049,471 A | 4/2000 | Korcharz et al. ............... 363/20 |
| 6,552,919 B1 | 4/2003 | Bors .............................. 363/42 |
| 9,899,913 B2 | * 2/2018 | Chang .................. H02M 3/156 |
| 2012/0146608 A1 | * 6/2012 | Wan ...................... H02M 3/156 |
| | | | 323/284 |

FOREIGN PATENT DOCUMENTS

EP          1847007 B1      7/2008      ............. H02M 1/15

OTHER PUBLICATIONS

Mammano, Robert, "Switching Power Supply Topology Voltage Mode vs. Current Mode," Unitrode Design Note, 4 pages, Jun. 27, 1994.
International Search Report and Written Opinion, Application No. PCT/US2019/017757, 10 pages, dated Jul. 11, 2019.

* cited by examiner

*Primary Examiner* — Shawki S Ismail
*Assistant Examiner* — Monica Mata
(74) *Attorney, Agent, or Firm* — Slayden Grubert Beard PLLC

(57) ABSTRACT

An apparatus includes an input voltage, a comparator configured to generate a pulsed-width modulation signal based upon variation in the input voltage using a reference signal, and a switched mode power supply control circuit configured to control a power supply in voltage mode based at least upon the first pulsed-width modulation signal.

20 Claims, 2 Drawing Sheets

FEED-FORWARD FUNCTION FOR VOLTAGE MODE CONTROL

PRIORITY

The present application claims priority to U.S. Provisional Patent Application No. 62/710,463, filed Feb. 16, 2018, the contents of which are hereby incorporated in their entirety.

FIELD OF THE INVENTION

The present disclosure relates to switched-mode power supplies (SMPS) and, more particularly, to a feed-forward function for voltage mode control.

BACKGROUND

An SMPS may be used to provide power as an SMPS typically performs with good regulation due to switched feedback, as well as efficient and economical filtering. In switched-mode power supplies, overvoltage protection may prevent the power supply output from exceeding a predetermined maximum value, thus preventing circuit malfunction and possible damage to circuitry powered by the switched-mode power supply.

A switching power supply may be controlled through voltage mode control (VMC). VMC may include a single voltage feedback path, with pulsed-width modulation (PWM) performed by comparing the voltage error signal with a constant ramp waveform. Current limiting may be performed separately. Advantages of VMC may include that a single feedback loop is easier to design and analyze; a large-amplitude ramp waveform provides good noise margin for a stable modulation process; and a low-impedance power output provides better cross-regulation for multiple output supplies. Disadvantages of VMC may include that any change in line or load must first be sensed as an output change and then corrected by the feedback loop. This can result in a slow response. The disadvantages of VMC may also include that the output filter adds two poles to the control loop requiring either a dominant-pole low frequency roll-off at the error amplifier or an added zero in the compensation. In VMC, compensation is further complicated by the fact that the loop gain varies with input voltage.

A switching power supply may instead be controlled through current mode control (CMC). CMC may address many of the disadvantages of VMC. CMC may use an oscillator as a fixed-frequency clock. Instead of a ramp waveform, a signal derived from output inductor current may be used. CMC may offer advantages. For example, since inductor current rises with a slope determined by voltage differences, this waveform will respond immediately to line voltage changes, eliminating both the delayed response and gain variation with changes in input voltage. In addition, since the error amplifier is used to command an output current rather than voltage, the effect of an output inductor is minimized and the filter now offers only a single pole to the feedback loop. This may allow both simpler compensation and a higher gain bandwidth over a comparable VMC solution. Additional benefits with CMC include inherent pulse-by-pulse current limiting by merely clamping the command from the error amplifier, and the ease of providing load sharing when multiple power units are paralleled. Disadvantages of CMC may include that there are now two feedback loops, making circuit analysis more difficult. Furthermore, the control loop becomes unstable at duty cycles above 50% unless slope compensation is added.

In addition, since the control modulation is based on a signal derived from output current, resonances in the power stage can insert noise into the control loop. Also, a particularly troublesome noise source is the leading edge current spike typically caused by transformer winding capacitance and output rectifier recovery current. In addition, with the control loop forcing a current drive, load regulation is worse and coupled inductors are required to get acceptable cross-regulation with multiple outputs.

Voltage feed-forward may be used to eliminate the effects of line voltage variations, and higher frequency capability which allow the poles of the output filter to be placed above the range of normal control loop bandwidth. Voltage feed-forward may be accomplished by making the slope of the ramp waveform proportional to input voltage. This provides a corresponding and correcting duty cycle modulation with no action needed by the feedback loop. The result may be a constant control loop gain and instantaneous response to line voltage changes.

SUMMARY

Embodiments of the present disclosure include an apparatus. The apparatus may include an input voltage, a first comparator configured to generate a first pulsed-width modulation signal based upon variation in the input voltage using a reference signal, and a switched mode power supply (SMPS) control circuit configured to control a power supply in voltage mode based at least upon the first pulsed-width modulation signal. In combination with any of the above embodiments, the apparatus may further include a signal generator circuit configured to generate a periodic signal based at least upon the first pulsed-width modulation signal, wherein the SMPS control circuit is configured to control the power supply further based at least upon the periodic signal. The signal generator circuit may be further configured to start the periodic signal sooner or later based upon the variation in the input voltage represented in the first pulsed-width modulation signal. In combination with any of the above embodiments, the first comparator may be configured to adjust a duty cycle of the first pulsed-width modulation signal based upon the variation in the input voltage. In combination with any of the above embodiments, the first comparator may be configured to reduce a duty cycle of the first pulsed-width modulation signal based upon a positive variation in the input voltage. In combination with any of the above embodiments, the e first comparator may be configured to raise a duty cycle of the first pulsed-width modulation signal based upon a negative variation in the input voltage. In combination with any of the above embodiments, a duty cycle of the first pulsed-width modulation signal indicates the variation in the input voltage. In combination with any of the above embodiments, the signal generator circuit may be further configured to generate a periodic signal based upon the first pulsed-width modulation signal. In combination with any of the above embodiments, the apparatus may further include a second comparator configured to compare an error in power output with the periodic signal, generate a second pulsed-width modulation signal based on the comparison, and provide the second pulsed-width modulation signal to the SMPS control circuit. In combination with any of the above embodiments, the SMPS control circuit may be configured to receive the second pulsed-width modulation signal on a falling edge input. In combination with any of the above embodiments, the reference signal may be a ramp signal generated according to a frequency at least as fast as the SMPS control circuit operation frequency.

Embodiments of the present disclosure may include a microcontroller, a power supply, a power supply controller, or a system including any of the above embodiments of an apparatus.

Embodiments of the present disclosure may include a method performed by the operation of a microcontroller, a power supply, a power supply controller, apparatus, or a system of the above embodiments.

DETAILED DESCRIPTION

Figure 1:
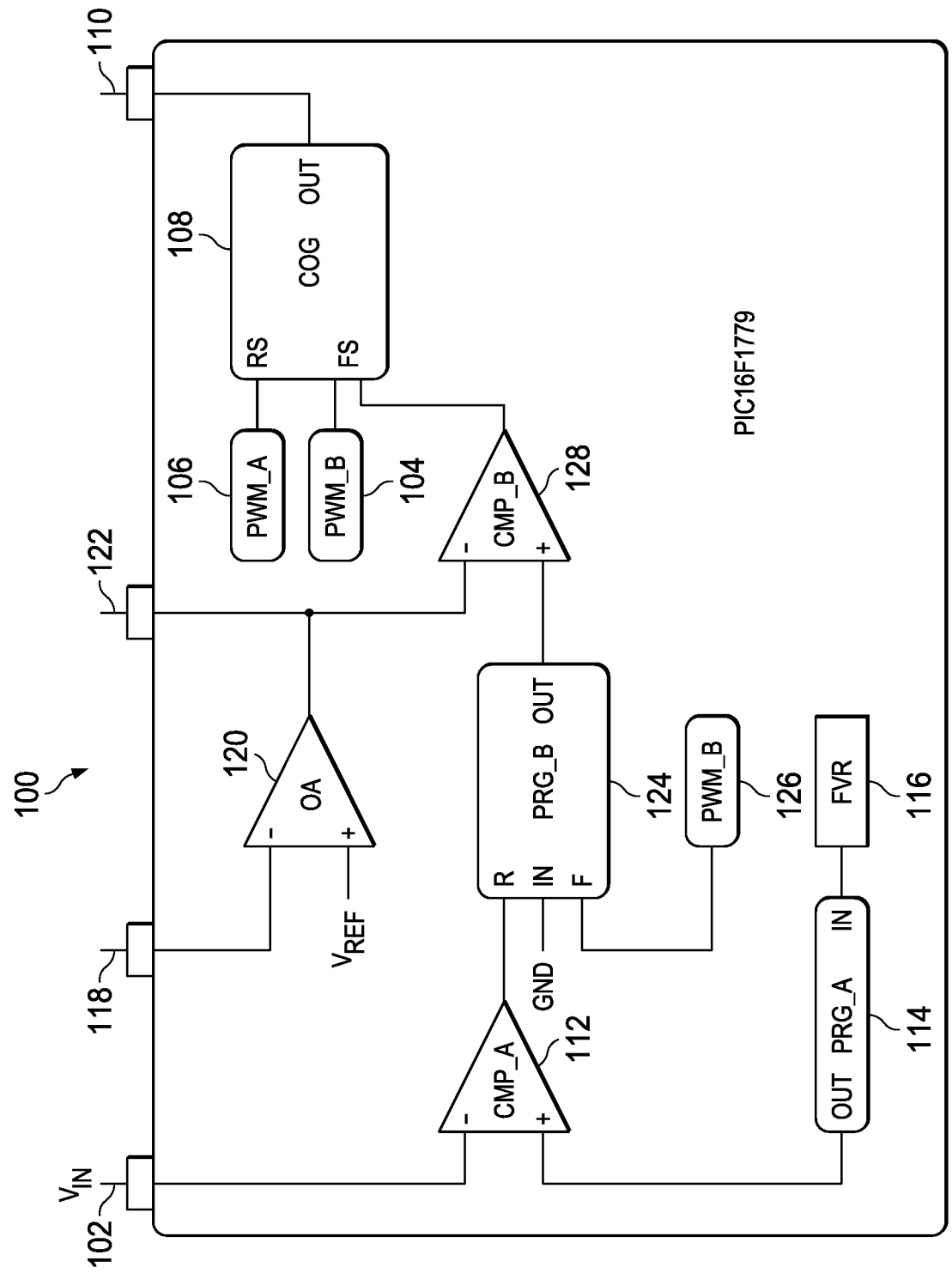
FIG. 1 is an illustration of a circuit configured to perform feed-forward functions for voltage mode control, according embodiments of the present disclosure.

FIG. 1 is an illustration of a circuit 100, according to embodiments of the present disclosure. In one embodiment, circuit 100 may be configured to perform feed-forward functions for voltage mode control. Voltage mode control may be more usable for high-power SMPS applications when implemented with feed-forward functionality. Circuit 100 may implement a CPU-independent peripheral (CIP) to implement such a function. The needed feedforward function may be performed without the use of the core while operating. In one embodiment, when input voltage goes high, the resultant duty cycle may go low. In another embodiment, when input voltage goes low, the resultant duty cycle may go high.

In SMPS applications, voltage mode control loops, as opposed to current mode control loops, may have an advantage of not measuring the inductor current. This may provide an advantage in high power solutions, wherein measuring inductor current may become expensive and troublesome. However, a disadvantage of voltage mode control loops is that such solutions need a switching cycle to correct input voltage variations. Adding feedforward measurements to the voltage mode control loop allows the loop to compensate for input voltage variations as they occur. Other solutions may use multiple transconductance op-amps, wherein the outputs of the op-amps are connected together to implement the needed feedback and feed-forward function.

Circuit 100 may include a comparator A 112, a comparator B 128, a programmable ramp generator (PRG) A 114, a PRG B 124, a fixed voltage reference (FVR) 116, two pulsed-width modulation (PWM) signals PWM_A 106 and PWM_B 104, a voltage input VIN 102, an op-amp 120, and a complementary output generator (COG) 108. Each of these elements may be implemented in any suitable manner, such as with analog circuitry, digital circuitry, or any suitable combination thereof. In one embodiment, each of these elements may be available as CIPs on a microcontroller.

Circuit 100 may be included in any suitable larger system, module, CIP, controller, SMPS controller, or electronic device. Circuit 100 may be implemented as a CIP in a microcontroller, for example. By implementing circuit 100 as a CIP, once circuit 100 is operating it may operate independently of a CPU of the microcontroller. That is, circuit 100 might not require software or execution of instructions to perform its ongoing functions. The specific operating parameters for circuit 100 may be set by software in, for example, registers that are translated for use by circuit 100. However, circuit 100 itself might not require ongoing instructions from a CPU to perform its functionality. Circuit 100 may be implemented in, for example, a PIC16F1769, PIC16F1779, or similar microcontroller available from the assignee of the present disclosure, Microchip Technology.

COG 108 may be implemented by any suitable combination of circuitry and may be configured to generate a duty cycle of the larger SMPS, thus controlling the SMPS conversion and generation. The duty cycle may be implemented in a control signal 110 output from COG 108, and may be used to start or stop voltage output transistors in the SMPS.

PWM_A 106 and PWM_B 104 may be generated by PWM sources. The duty cycle and frequency of these PWM sources may be set by, for example, a switch, fuse, or register value. PWM_A 106 may be configured to generate operating frequency of COG 124 and of the larger SMPS. The duty cycle of PWM_B 104 may provide a limit of the maximum duty cycle to be generated. PWM_A 106 may be configured to be input to COG 124 according to a rising edge input. PWM_B 105 may be configured to be input to COG 124 according to a falling edge input.

FVR 116 may be used as input to PRG A 114. PRG A 114 may be configured to generate a periodic sawtooth triangular, inverse sawtooth, or similar signal. The signal may rise from a zeroed level to the voltage limit specified by FVR 116. The generated sawtooth signal may have a same frequency as the SMPS itself. The sawtooth signal may be compared to VIN 102. The result may be a conversion of input voltage information to a PWM signal. FVR 116 may provide a switching frequency for PRG A 114. FVR 116 frequency may the same as or faster than the switching frequency of the SMPS. If FVR 116 frequency is faster than the switching frequency of the SMPS, then operations of feedforward voltage may be faster than the SMPS. The frequency of feedforward voltage should be as fast or faster than the SMPS switching frequency.

A negative input of comparator A 112 may be VIN 102. A positive input of comparator A 112 may be the sawtooth or other signal from PRG A 114. Comparator A 112 may be configured to convert VIN 102 into a PWM signal. The resultant PWM signal may have a duty-cycle that is value-dependent to the variation of VIN 102. The frequency of the resultant PWM signal may be inversely proportional or directly proportional to variation of VIN 102. Feedforward voltage may be implemented in the output of comparator A 112.

The resulting PWM signal from comparator A 112 may be issued to another PRG B 124. The falling event (F input) of PRG B 124 may be set according to PWM_B 126, which may be a duplicate of PWM_B 104. The falling slope of the PWM signal obtained from comparator A 112 may act as a rising event (R input) for PRG B 124. The result may be a sawtooth signal necessary for voltage mode control. As discussed above, by setting the falling event of PRG B 124 to PWM_B 126, the falling event thus comes from the maximum duty-cycle limit of COG 108. The rising event may cause PRG B 124 to generate its own periodic signal, such as starting its sawtooth signal. The falling event may cause PRG B 124 to stop its periodic signal and return output to zero.

Output of PRG B 124 may include a sawtooth signal. The sawtooth signal may be configured to start earlier or later than an initial or expected value. The degree to which the resulting sawtooth signal starts earlier or later may depend on the variation on VIN 102 and its changes, which induces a duty-cycle change of the COG output. The expected value may be based upon a last or expected value of VIN 102. Positive variation in VIN 102 might cause PRG A 114 to be greater than VIN 102 sooner, and thus comparator A 112 may generate a signal with a transition (a falling edge) that occurs sooner-in-time. The sooner-in-time transition may thus cause PRG B 124 to begin generating its periodic signal sooner. Negative variation in VIN 102 might cause PRG A 114 to be greater than VIN 102 at a later point in time, and thus comparator A 112 may generate a signal with a transition that occurs later-in-time. The later-in-time transition may thus cause PRG B 124 to begin generating its periodic signal later. At the end of a period of generation of PRG A 114 or PWM_B 126, comparator A 112 and PRG B may reset their outputs.

PWM signals such as PWM_A 106 and PWM_B 104/126 may be generated by various CIPs or other components available on a microcontroller or system in which circuit 100 is implemented. The frequency and duty cycle of generated PWM signals may be set according to registers or commands.

Pin 118 may be configured to receive output voltage from the SMPS. This voltage may be resistively divided to an appropriate input range before arriving at pin 118.

Op-amp 120 may be configured to determine a difference between output voltage of the SMPS as received on pin 118 and a voltage, given by VREF. The output of op-amp 120 may be an error in the expected versus measured SMPS voltage. The error may be output on pin 122 and provided to comparator B 128 at the negative input of comparator B 128. Pin 122 may produce an error output from op-amp 120. Pin 122 may enable error output to be used externally to circuit 100.

Comparator B 128 may receive at its positive input the sawtooth function provided by PRG B 124. Such a sawtooth function may start earlier or later than expected based upon variation of input voltage VIN 102. Output of comparator B 128 may reflect whether the sawtooth function provided by PRG B 124 has crossed the value of the feedback voltage error. One the sawtooth function provided by PRG B 124 has crossed the value of the feedback voltage error, comparator B 128 may have a transition event. The result may thus be a PWM signal. The PWM signal generated by comparator B 128 may transition (for example, from high to low) sooner when the sawtooth function from PRB B 124 crosses the value of the feedback voltage error from op-amp 120 sooner. Similarly, the PWM signal generated by comparator B 128 may transition later when the sawtooth function crosses the value of the feedback voltage error later. Thus, at PRG B 124, by causing the sawtooth function to start earlier or later depending upon voltage variation of VIN 102, the PWM signal generated by comparator B 128 is sped up or slowed.

Output of comparator 128 may be fed into a falling edge input of COG 108. COG 108 may accept multiple falling edge inputs. These may be logically combined. For example, COG 108 may include falling edge inputs for both output of comparator 128 and PWM_B 104. COG 108 may issue control signal 110 that specifies or includes a duty cycle for the larger SMPS. The lowest common denominator between these inputs may be used to determine a limit of the duty cycle issued in control signal 110.

Control signal 110 may behave similarly to output of comparator 128 since output of comparator 128 dictates the falling event of COG 108. In one embodiment, control signal 110 may have the same characteristics as signal 204 of FIG. 2, below.

Figure 2:
FIG. 2 is a timing diagram of a circuit configured to perform feed-forward functions for voltage mode control, according embodiments of the present disclosure.

FIG. 2 is an illustration of a timing diagram, according to embodiments of the present disclosure. The timing diagram may illustrate operation of circuit 100.

VIN 202 illustrates example input voltage, such as that received at VIN 102. VIN 202 will change over time according to the input voltage that is actually received.

CMP_B 204 illustrates example output of comparator B 128.

VFB 206 illustrates example feedback voltage.

PRG_B 208 illustrates example output of PRG B 124.

CMP_A 210 illustrates example output of comparator A 112.

VIN_INV 212 illustrates an inverse of VIN 202.

As shown in FIG. 2, as VIN 202 grows, the duty cycle of CMP_B 204 shrinks. As VIN 202 shrinks, the duty cycle of CMP_B 204 grows. The duty cycle of CMP_A 210 also shrinks as VIN 202 grows. The duty cycle of CMP_A 210 also grows as VIN 202 shrinks.

More specifically, CMP_A 210 may de-assert when the inverse of VIN 202 reaches the value of the sawtooth generated by PRG_A 214. CMP_B 204 may de-assert when feedback voltage matches the value of the sawtooth generated by PRG_B 208. PRG_B 208 starts later when VIN 202 rises. PRG_B 208 starts earlier when VIN 202 falls. Thus, when VIN 202 changes, PRG_B 208 waits until VIN 202 compared to the sawtooth generates a rising edge. Upon such an event, PRG_B 208 begins generated its waveform. The waiting causes a delay proportional to the change in VIN 202. The resulting information informs the SMPS about the variation in VIN 202.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

I claim:

1. An apparatus, comprising:
   an input voltage;
   a first comparator configured to generate a first pulsed-width modulation signal based upon variation in the input voltage using a reference signal and send the first pulsed-width modulation signal to further elements of the apparatus;
   a switched mode power supply (SMPS) control circuit, separate from the first comparator, configured to control a power supply in voltage mode based at least upon the first pulsed-width modulation signal;
   an operational amplifier configured to generate an error signal based on a differential between output of the power supply and a reference voltage;
   a signal generator circuit configured to generate a periodic signal based upon the first pulsed-width modulation signal; and
   a second comparator configured to:
      receive the error signal generated by the operational amplifier as a first input;
      receive the periodic signal generated by the signal generator circuit as a second input; and
      output a comparison of inputs of the second comparator to the SMPS control circuit.

2. The apparatus of claim 1, wherein the first comparator is configured to adjust a duty cycle of the first pulsed-width modulation signal based upon the variation in the input voltage.

3. The apparatus of claim 1, wherein the first comparator is configured to reduce a duty cycle of the first pulsed-width modulation signal based upon a positive variation in the input voltage.

4. The apparatus of claim 1, wherein the first comparator is configured to raise a duty cycle of the first pulsed-width modulation signal based upon a negative variation in the input voltage.

5. The apparatus of claim 1, wherein a duty cycle of the first pulsed-width modulation signal indicates the variation in the input voltage.

6. The apparatus of claim 1, wherein the SMPS control circuit is configured to receive a second pulsed-width modulation signal on a falling edge input.

7. The apparatus of claim 1, wherein the reference signal is a ramp signal generated according to a frequency at least as fast as the SMPS control circuit operation frequency.

8. The apparatus of claim 1, wherein the signal generator circuit is further configured to:
generate the periodic signal based at least upon the first pulsed-width modulation signal, wherein the SMPS control circuit is configured to control the power supply further based at least upon the periodic signal; and
start the periodic signal sooner or later based upon the variation in the input voltage represented in the first pulsed-width modulation signal.

9. The apparatus of claim 8, wherein the variation in the input voltage is represented by a duty cycle in the first pulsed-width modulation signal, and the signal generator circuit is further configured to start the periodic signal sooner or later using the duty cycle of the first pulsed-width modulation signal.

10. A microcontroller, comprising:
an input voltage;
a first comparator configured to generate a first pulsed-width modulation signal based upon variation in the input voltage using a reference signal and send the first pulsed-width modulation signal to further elements of the apparatus;
a switched mode power supply (SMPS) control circuit, separate from the first comparator, configured to control a power supply in voltage mode based at least upon the first pulsed-width modulation signal;
an operational amplifier configured to generate an error signal based on a differential between of the power supply and a reference voltage;
a signal generator circuit configured to generate a periodic signal based upon the first pulsed-width modulation signal; and
a second comparator configured to:
receive, at a first input of the second comparator, the error signal generated by the operational amplifier;
receive, at a second input of the second comparator, the periodic signal generated by the signal generator circuit; and
output a comparison of inputs of the second comparator to the SMPS control circuit.

11. The microcontroller of claim 10, wherein the signal generator circuit is further configured to:
generate the periodic signal based at least upon the first pulsed-width modulation signal, wherein the SMPS control circuit is configured to control the power supply further based at least upon the periodic signal; and
start the periodic signal sooner or later based upon the variation in the input voltage represented in the first pulsed-width modulation signal.

12. A method, comprising:
receiving an input voltage;
generating a first pulsed-width modulation signal with a first comparator based upon variation in the input voltage using a reference signal;
with a switched mode power supply (SMPS) control circuit separate from the first comparator, controlling a power supply in voltage mode based at least upon the first pulsed-width modulation signal;
with an operational amplifier, generating an error signal based on a differential between output of the power supply and a reference voltage; with a signal generator circuit, generating a periodic signal based upon the first pulsed-width modulation signal; and with a second comparator: receiving the generated error signal; receiving the periodic signal generated by the signal generator circuit; and outputting a comparison of inputs of the second comparator to the (SMPS) control circuit.

13. The method of claim 12, further comprising:
generating the periodic signal based at least upon the first pulsed-width modulation signal, wherein the SMPS control circuit is configured to control the power supply further based at least upon the periodic signal; and
starting the periodic signal sooner or later based upon the variation in the input voltage represented in the first pulsed-width modulation signal.

14. The method of claim 12, further comprising adjusting a duty cycle of the first pulsed-width modulation signal based upon the variation in the input voltage.

15. The method of claim 12, further comprising reducing a duty cycle of the first pulsed-width modulation signal based upon a positive variation in the input voltage.

16. The method of claim 12, further comprising raising a duty cycle of the first pulsed-width modulation signal based upon a negative variation in the input voltage.

17. The method of claim 12, wherein a duty cycle of the first pulsed-width modulation signal indicates the variation in the input voltage.

18. The method of claim 12, wherein the reference signal is a ramp signal generated according to a frequency at least as fast as operation frequency of controlling the power supply.

19. The method of claim 12, further comprising:
generating a periodic signal based upon the first pulsed-width modulation signal;
comparing an error in power output with the periodic signal;
generating a second pulsed-width modulation signal based on the comparison; and
providing the second pulsed-width modulation signal to the SMPS control circuit.

20. The method of claim 19, further comprising receiving the second pulsed-width modulation signal on a falling edge input to generate an output signal.

* * * * *